United States Patent
Speiermann et al.

(10) Patent No.: US 12,098,748 B2
(45) Date of Patent: Sep. 24, 2024

(54) MAGNETIC BEARINGS FOR FLYWHEEL ROTOR LEVITATION WITH RADIAL STABILIZATION

(71) Applicant: WATTSUP POWER A/S, Hvidovre (DK)

(72) Inventors: Martin Speiermann, Hvidovre (DK); Christian Bahl, Taastrup (DK); Kaspar K. Nielsen, Roskilde (DK); Rasmus Bjørk, Roskilde (DK); Valère Combescot, Hvidovre (DK); Jacopo Granata, Hvidovre (DK)

(73) Assignee: WATTSUP POWER A/S, Hvidovre (DK)

( * ) Notice: Subject to any disclaimer, the term of this patent is extended or adjusted under 35 U.S.C. 154(b) by 0 days.

(21) Appl. No.: 17/287,961

(22) PCT Filed: Oct. 22, 2019

(86) PCT No.: PCT/IB2019/001140
§ 371 (c)(1),
(2) Date: Apr. 22, 2021

(87) PCT Pub. No.: WO2020/084345
PCT Pub. Date: Apr. 30, 2020

(65) Prior Publication Data
US 2021/0372473 A1 Dec. 2, 2021

Related U.S. Application Data

(60) Provisional application No. 62/749,083, filed on Oct. 22, 2018.

(51) Int. Cl.
| H02K 7/09 | (2006.01) |
| F16C 32/04 | (2006.01) |
| H02K 7/02 | (2006.01) |

(52) U.S. Cl.
CPC ...... *F16C 32/0493* (2013.01); *F16C 2361/55* (2013.01); *F16C 2380/28* (2013.01)

(58) Field of Classification Search
CPC ............ H02K 7/00; H02K 7/02; H02K 7/025; H02K 7/09; F16C 32/00; F16C 32/04
See application file for complete search history.

(56) References Cited

U.S. PATENT DOCUMENTS

| 4,444,444 A | 4/1984 | Benedetti et al. |
| 5,245,270 A | 9/1993 | Akiyama |

(Continued)

FOREIGN PATENT DOCUMENTS

| CN | 101409478 B | 5/2012 |
| CN | 105257698 A | 1/2016 |

(Continued)

OTHER PUBLICATIONS

International Patent Application No. PCT/IB2019/001140, International Search Report and Written Opinion dated Feb. 25, 2020, 15 pgs.

(Continued)

*Primary Examiner* — Tran N Nguyen
(74) *Attorney, Agent, or Firm* — Cozen O'Connor

(57) ABSTRACT

A flywheel system includes a fixture including a bottom support, a rotor characterized by a gravitational load and configured to rotate above the bottom support about a rotation axis, and a bottom magnetic levitation bearing. The bottom magnetic levitation bearing includes (a) a ring of first magnets mechanically coupled with a bottom end of the rotor, (b) a ring of second magnets mechanically coupled to the bottom support, beneath the ring of first magnets, the second magnets repelling the first magnets to magnetically support at least a portion of the gravitational load above the bottom support, (c) a ring of third magnets mechanically (Continued)

coupled with the bottom end, and (d) a ring of fourth magnets mechanically coupled to the bottom support radially outwards from the ring of third magnets, the fourth magnets repelling the third magnets to at least reduce radial decentering of the rotor relative to the fixture.

10 Claims, 8 Drawing Sheets

(56) References Cited

U.S. PATENT DOCUMENTS

| | | | | |
|---|---|---|---|---|
| 6,218,751 | B1 * | 4/2001 | Bohlin | G01N 11/14 |
| | | | | 310/91 |
| 6,420,810 | B1 | 7/2002 | Jeong | |
| 6,570,286 | B1 * | 5/2003 | Gabrys | F16C 32/0414 |
| | | | | 310/90.5 |
| 2009/0308285 | A1 * | 12/2009 | Bode | F16C 32/044 |
| | | | | 310/90.5 |
| 2014/0210424 | A1 * | 7/2014 | Schroeder | H02K 7/025 |
| | | | | 322/4 |

FOREIGN PATENT DOCUMENTS

| | | | |
|---|---|---|---|
| EP | 1878913 | A1 | 1/2008 |
| JP | 54-121143 | | 12/1979 |
| JP | 58-043158 | | 3/1983 |
| JP | H08178011 | A | 7/1996 |
| JP | H08200470 | A | 8/1996 |
| JP | H08296645 | A | 11/1996 |
| JP | 2018009644 | A | 1/2018 |
| WO | WO9618818 | A1 * | 6/1996 |
| WO | WO2016041987 | * | 3/2016 |

OTHER PUBLICATIONS

Indian Patent Application No. 202127022836; First Examination Report dated Oct. 21, 2022; 5 pgs.

Eurasian Application No. 202191111; Notice of Readiness to Grant the Eurasian Patent dated Oct. 5, 2022; 6 pgs.

Eurasian Application No. 202191111; Office Action dated Feb. 28, 2022; 6 pgs.

Japanese Patent Application No. 2021-547961, Office Action dated Oct. 31, 2023 with English translation.

* cited by examiner

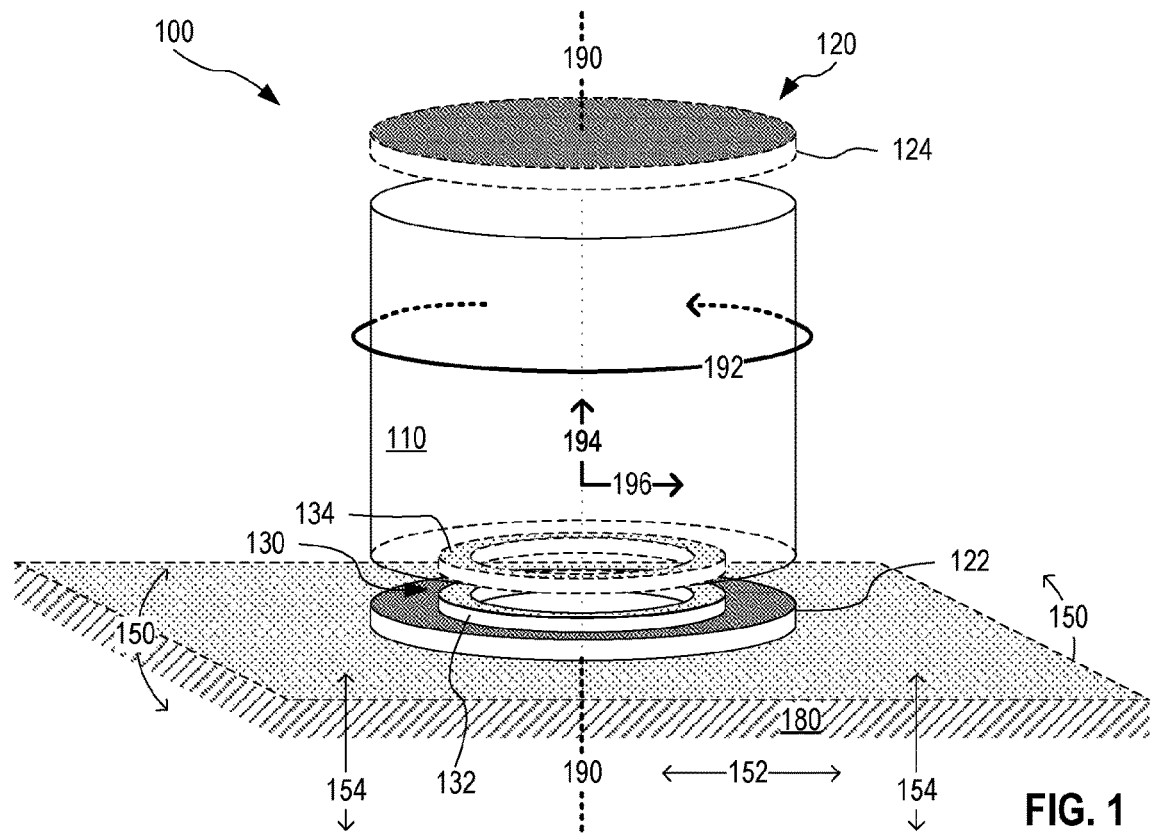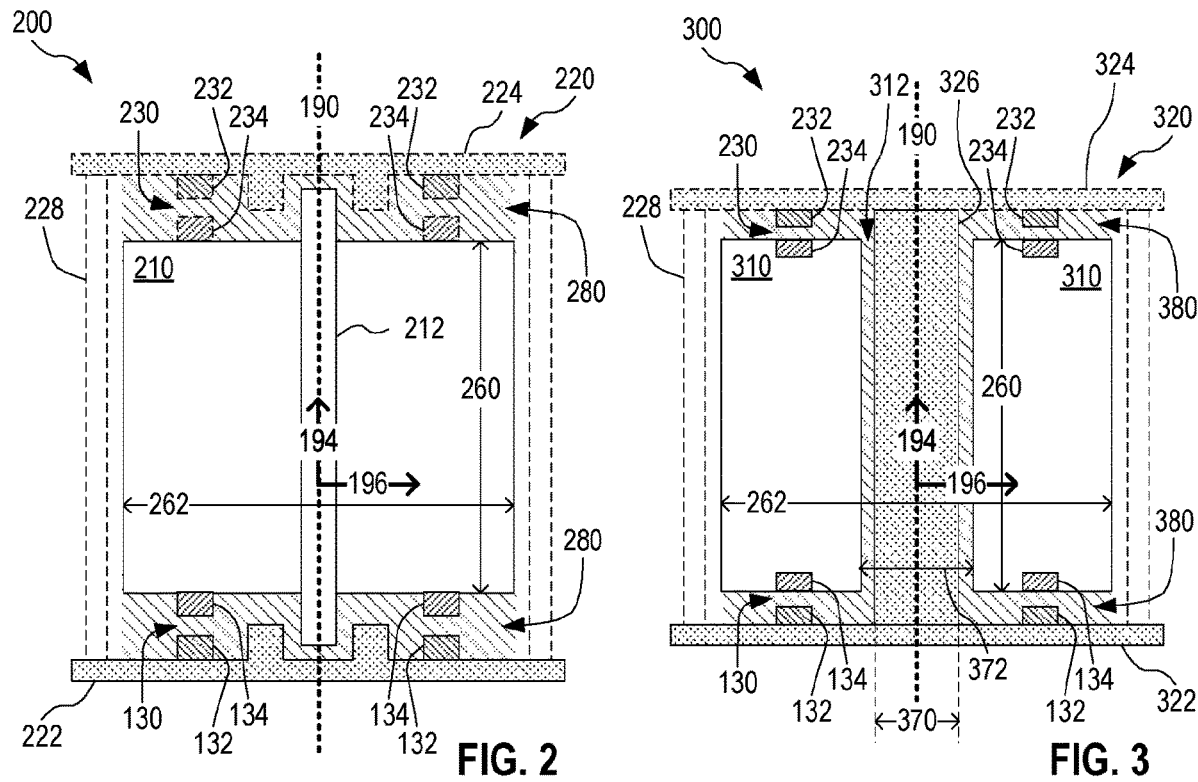

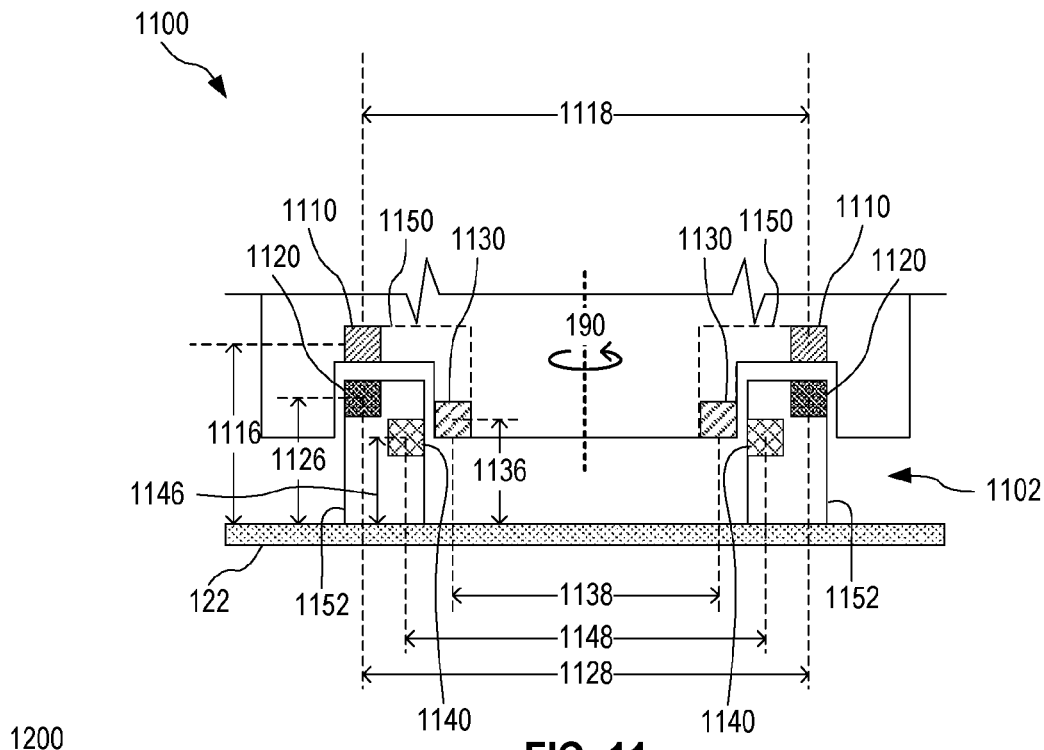
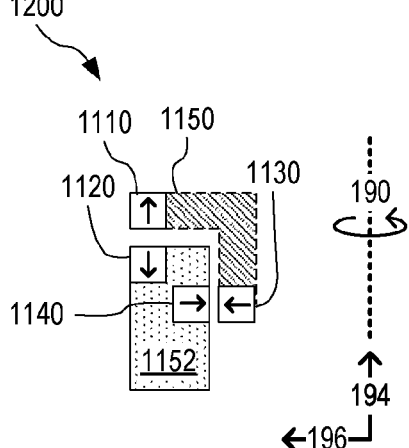
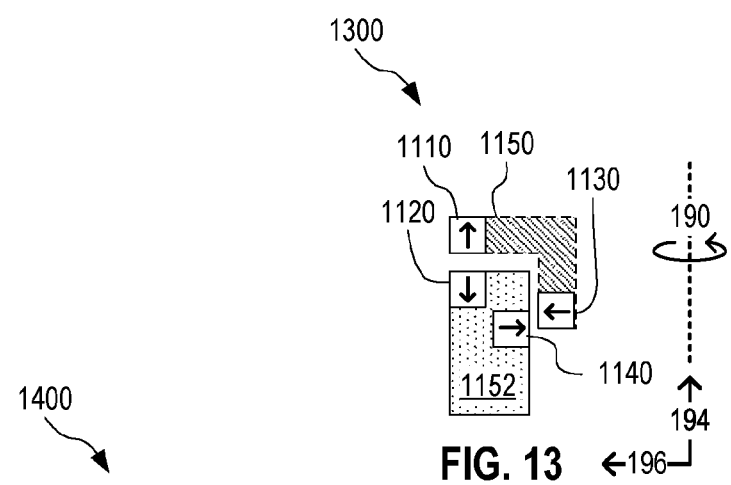
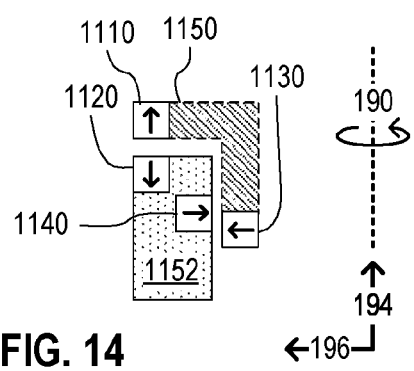

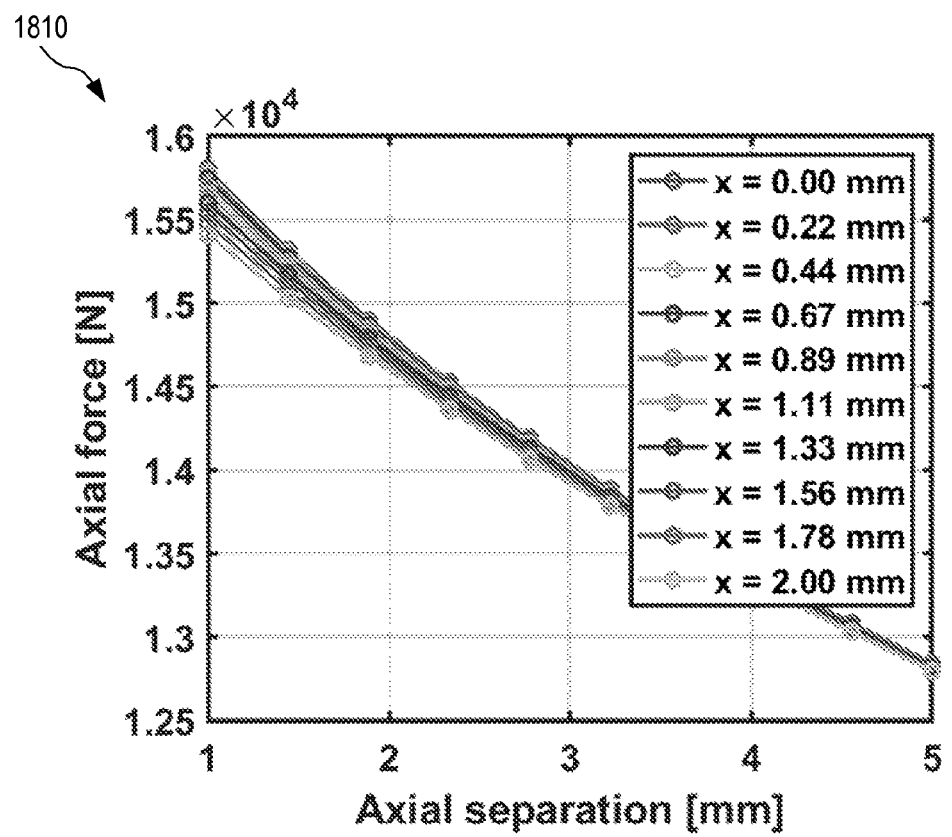
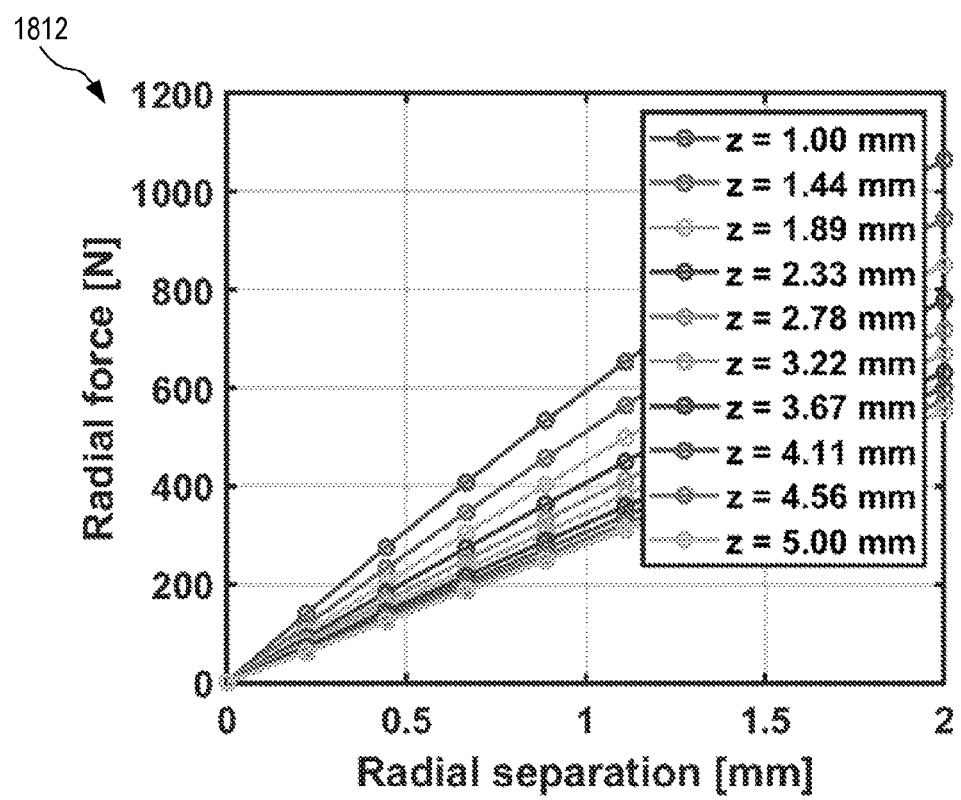
FIG. 18

MAGNETIC BEARINGS FOR FLYWHEEL ROTOR LEVITATION WITH RADIAL STABILIZATION

CROSS-REFERENCE TO RELATED APPLICATIONS

The present application is a 35 U.S.C. § 371 filing of International Application No. PCT/IB2019/001140 filed Oct. 22, 2019, which claims the benefit of priority from U.S. Patent Application Ser. No. 62/749,083, filed on Oct. 22, 2018, which is incorporated herein by reference in its entirety.

BACKGROUND

A flywheel system is a mechanical device that stores rotational energy in a rotating mass, i.e., a rotor. The amount of energy stored in the rotor is proportional to the square of the rotor's rotational speed. The rotor may be magnetically coupled with an electromagnetic generator stator to allow the flywheel system to convert between rotational energy of the rotor and electrical energy. The generator stator may decelerate the rotor to produce electrical energy from the rotational energy extracted from the rotor, and the generator stator may receive electrical energy and convert this electrical energy to rotational energy of the rotor resulting in acceleration of the rotor. Flywheel systems may be designed to have large energy storage capacity, and are further capable of both delivering and absorbing energy rapidly. Common uses of a flywheel system include (a) peak-shaving of the power output of another energy source such as a combustion generator stator, (b) energy storage, (c) backup power supply, and (d) rapid energy delivery.

Low-loss energy storage in a flywheel system requires that the rotor rotates with very little friction. Therefore, the rotor of a high-performance flywheel typically is magnetically levitated to counteract the gravitational force.

SUMMARY

In an embodiment, a flywheel system includes a fixture including a bottom support, a rotor characterized by a gravitational load and configured to rotate above the bottom support about a rotation axis, and a bottom magnetic levitation bearing. The bottom magnetic levitation bearing includes (a) a ring of first magnets mechanically coupled with a bottom end of the rotor, (b) a ring of second magnets mechanically coupled to the bottom support, beneath the ring of first magnets, the second magnets repelling the first magnets to magnetically support at least a portion of the gravitational load above the bottom support, (c) a ring of third magnets mechanically coupled with the bottom end, and (d) a ring of fourth magnets mechanically coupled to the bottom support radially outwards from the ring of third magnets, the fourth magnets repelling the third magnets to at least reduce radial decentering of the rotor relative to the fixture.

In an embodiment, a method for levitating and radially stabilizing a rotor of a flywheel system includes (a) passively exerting an upwards magnetic force on a plurality of first magnets, mechanically coupled with the rotor, to carry at least part of gravitational load of the rotor, and (b) passively exerting a radially inwards force on a plurality of second magnets, mechanically coupled with the rotor, to at least reduce radial de-centering of the rotor.

BRIEF DESCRIPTION OF THE DRAWINGS

FIG. 1 illustrates a flywheel system including a magnetic levitation bearing for rotor levitation with radial stabilization, according to an embodiment.

FIG. 2 illustrates a flywheel system having a rotating shaft and including a magnetic levitation bearing for rotor levitation with radial stabilization, according to an embodiment.

FIG. 3 illustrates a flywheel system having a stationary shaft and including a magnetic levitation bearing for rotor levitation with radial stabilization, according to an embodiment.

FIG. 11 illustrates another flywheel system that includes another four-ring magnetic levitation bearing providing both axial and radial stabilization, according to an embodiment.

FIGS. 12, 13, and 14 illustrate three respective height configurations of the four-ring magnetic levitation bearing of FIG. 11, according to embodiments.

FIG. 18 shows example axial and radial forces calculated for different magnetic levitation bearings configured for use with a 1500 kilogram rotor.

DETAILED DESCRIPTION OF THE EMBODIMENTS

Figure 4:
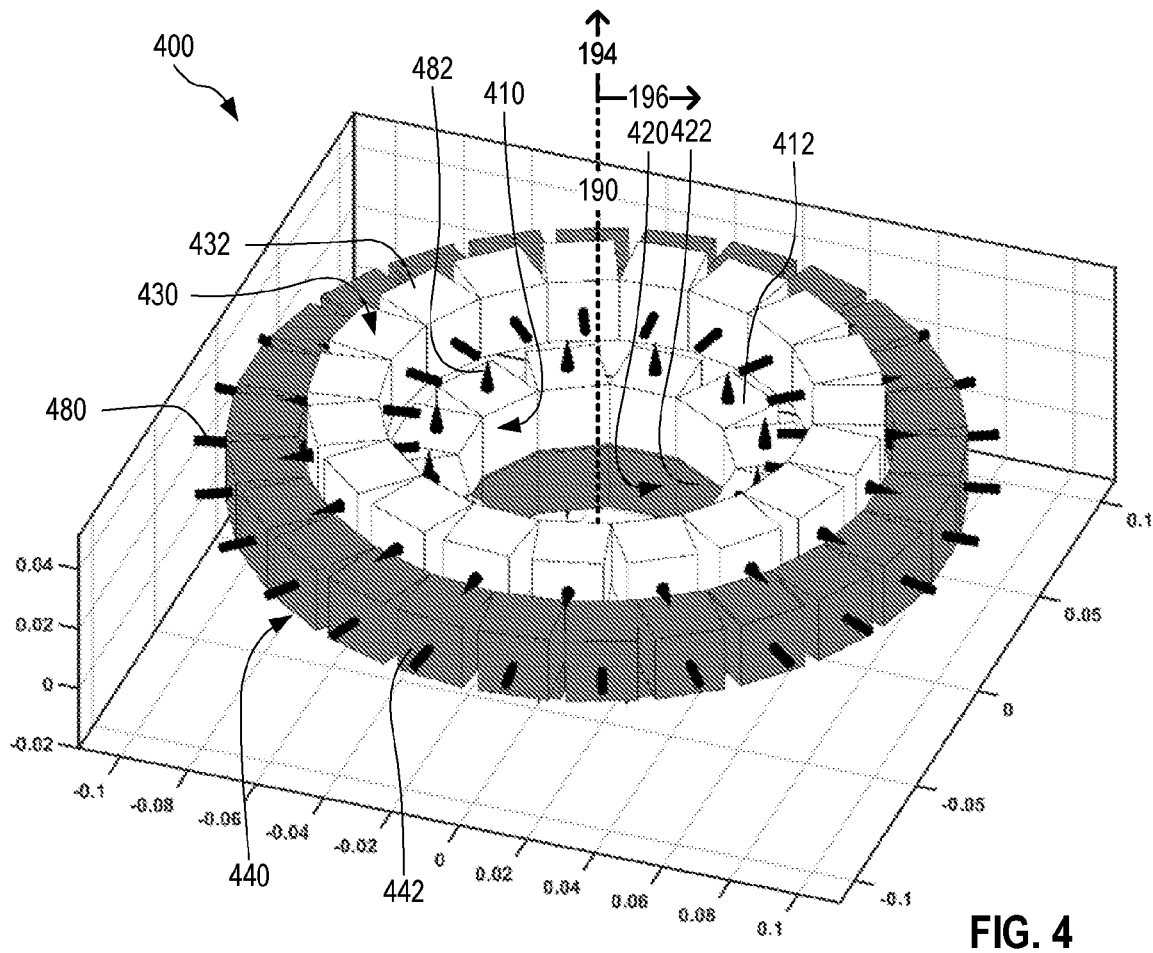
FIG. 4 illustrates a four-ring magnetic levitation bearing that provides both axial and radial stabilization, according to an embodiment.

Flywheel systems are being considered for use in offshore or onshore environments not connected to a conventional electrical grid but instead relying on a so-called micro grid. In these environments, flywheel systems may serve as a source of energy and, for example, provide power functionalities such as energy storage, backup power, peak-shaving and/or frequency control. Flywheel systems may serve to rapidly meet a high, short-term power demand. When implemented in environments that are potentially unstable, such as onboard a drillship, a semisubmersible drilling platform, or another marine vessel, or in an earthquake-prone area, the flywheel system is subject to substantial forces which can affect both the performance and lifetime of the flywheel system.

Flywheel systems often employ a magnetic levitation bearing that levitates the rotor of the flywheel above a base of the flywheel system. Conventionally, this magnetic levitation bearing is configured to counteract gravity and, for this purpose, applies an axial force to the rotor rotating about a substantially vertical rotation axis. Herein "axial" refers to a direction parallel to the rotation axis of the flywheel, and "radial" refers to a direction that is perpendicular to the rotation axis either away from or toward the rotation axis. The conventional magnetic levitation bearing includes a first set of permanent magnets affixed to a bottom of the rotor and second set of permanent magnets affixed to the base below the first set of permanent magnets. These two set of permanent magnets repel each other to apply an upwards force on rotor. However, the repelling nature of the magnetic coupling between the first and second set of permanent magnets creates an unstable equilibrium at the rotor position corresponding to the first set of permanent magnets being perfectly aligned above the second set of permanent magnets. Therefore, while the upwards force generated by the conventional magnetic levitation bearing may stabilize the rotor position in the axial dimension, the conventional magnetic levitation bearing is inherently unstable in the radial dimension. High performance flywheel systems may incorporate active magnetic bearings for actively stabilizing the rotor position in the radial dimension, when radial instability occurs as a result of, e.g., (a) movement of the environment, in which the flywheel is based, or (b) torque applied to the rotor by a motor/generator to accelerate or decelerate the rotor. These active magnetic bearings may also counteract the radial instability introduced by the conventional magnetic levitation bearing. Unfortunately, such active stabilization relies on electrical power and any work performed by the active magnetic bearing therefore ultimately reduces the energy efficiency of the flywheel system.

Disclosed herein are flywheel system with magnetic levitation bearings for levitating a rotor of the flywheel while also providing stabilization in the radial dimension. The disclosed magnetic levitation bearings may achieve both axial and radial stabilization using passive magnetic coupling with no electric power consumption. The radial stabilization provided by the presently disclosed magnetic levitation bearings may overcome or at least reduce the radial instability introduced by the axial stabilization also provided by the magnetic levitation bearing. The disclosed magnetic levitation bearings therefore enable improved energy efficiency of the flywheel system.

FIG. 1 illustrates one flywheel system 100 including a magnetic levitation bearing for rotor levitation with radial stabilization. FIG. 1 shows flywheel system 100 in an exemplary use scenario, wherein flywheel system 100 is situated on a foundation 180 that may be subject to movement at least occasionally. Flywheel system 100 includes a rotor 110 and a bottom support 122. Rotor 110 is configured to rotate about a rotation axis 190 in a direction 192 or in a direction opposite thereto. Flywheel system 100 further includes a bottom magnetic levitation bearing 130 that levitates rotor 110 above bottom support 122 while also providing stabilization in the radial dimension relative to rotation axis 190 of rotor 110. Flywheel system 100 may be configured to operate with rotation axis 190 being nominally vertical, such that bottom magnetic levitation bearing 130 supports at least a portion of the gravitational load of rotor 110 above bottom support 122. Herein, unless specified otherwise, the "rotation axis" of a rotor refers to the nominal rotation axis of the rotor, and it is understood that the actual rotation axis of the rotor may at least temporarily deviate from the nominal rotation axis.

Bottom magnetic levitation bearing 130 includes a magnetic structure 132 mechanically coupled with bottom support 122, and a magnetic structure 134 mechanically coupled with a bottom end of rotor 110. Magnetic structure 132 repels magnetic structure 134 to exert, on rotor 110, both (a) an upwards axial force along direction 194, and (b) a radially inwards force opposite direction 196. The radially inwards force counteracts radial decentering of rotor 110. Such radial decentering may occur as a result of instability associated with the magnetic field producing the upwards axial force, as a result of movement of the environment in which flywheel system 100 is situated, and/or as a result of a torque applied to rotor 110 by other functional components of flywheel system 100. In an embodiment, magnetic structures 132 and 134 are passive magnetic structures utilizing permanent magnets, such that bottom magnetic levitation bearing 130 consumes no power.

In the scenario depicted in FIG. 1, bottom support 122 is supported by a foundation 180, for example the floor of a building or a deck onboard a marine vessel. Bottom support 122 is substantially rigidly coupled to foundation 180 and therefore moves with foundation 180 when foundation 180 moves. Foundation 180 may undergo movement in a variety of directions, for example horizontal translation as indicated by arrow 152, vertical translation as indicated by arrows 154, and rotation as indicated by 150, or a combination thereof. The axial and radial stabilization of rotor 110 provided by bottom magnetic levitation bearing 130 may at least partly counteract relative movement between rotor 110 and bottom support 122 caused by movement of foundation 180.

The weight of rotor 110 may be between 10 and 10,000 kilograms. In one implementation configured for storage of relative large amounts of rotational energy in rotor 110, for example in a flywheel system 100 intended for use in offshore environments, the weight of rotor 110 is between 1 and 2 tons, such as 1.5 tons. In another implementation, configured for storage of smaller amounts of rotational energy in rotor 110, for example in a flywheel system 100 intended for household use, the weight of rotor 110 is between 10 and 100 kilograms.

In an embodiment, flywheel system 100 further includes a top support 124 positioned above a top end of rotor 110. Bottom support 122 and top support 124 may be part of a fixture 120. Although, for clarity of illustration not depicted in FIG. 1, embodiments of flywheel system 100 configured with top support 124 may further include a top magnetic levitation bearing. This top magnetic levitation bearing may be identical or similar to bottom magnetic levitation bearing 130 and, for example, include a second instance of magnetic structure 132 mechanically coupled with top support 124 and a second instance of magnetic structure 134 mechanically coupled with a top end of rotor 110. This top magnetic levitation bearing, when implemented, limits upwards movement of rotor 110 as well as provides radial stabilization of rotor 110 at its top end. Limiting upwards movement of rotor 110 may be advantageous in scenarios where foundation 180 moves down (and up) since, in such scenarios, the distance between rotor 110 and top support 124 will tend to decrease. The top magnetic levitation bearing may serve to prevent rotor 110 from bumping into top support 124, while also providing radial stabilization.

Although FIG. 1 depicts each of rotor 110, magnetic structure 132, and magnetic structure 134 as being of cylindrical shape, the shape of any one of rotor 110, magnetic structure 132, and magnetic structure 134 may deviate from being cylindrical. For example, the surface of rotor 110 may have recesses and/or protruding features to accommodate and position functional components that facilitate interaction between rotor 110 fixture 120. Likewise, the shape of either one of bottom support 122 and top support 124 may be different from that shown in FIG. 1.

Herein, the "top" and "bottom" of a component of a flywheel system is referenced to a vertical rotation axis 190. It is understood that the flywheel systems disclosed herein may be oriented with a non-vertical rotation axis, for example prior to installation in an operating environment, or when the operating environment causes the orientation of a nominally vertical rotation axis to deviate from vertical (e.g., during movement and/or oscillation of the foundation supporting a flywheel system designed to operate with a generally vertical orientation axis). The terms "above" and "below", as used herein, are similarly referenced to a vertical rotation axis.

FIG. 2 illustrates one flywheel system 200 having a rotating shaft and including a magnetic levitation bearing for rotor levitation with radial stabilization. FIG. 2 shows flywheel system 200 in cross-sectional view, with the cross section being in a plane that contains rotation axis 190. Flywheel system 200 is an embodiment of flywheel system 100. Flywheel system 200 includes a rotor 210, a bottom support 222, and bottom magnetic levitation bearing 130. Rotor 210 is an embodiment of rotor 110 that includes a shaft 212. Shaft 212 rotates with the rest of rotor 210. Bottom support 222 is an embodiment of bottom support 122 specifically tailored to interface (at least magnetically) with rotor 210 and its shaft 212. Magnetic structure 132 is mechanically coupled with bottom support 222, and magnetic structure 134 is mechanically coupled with a bottom end of rotor 210.

In certain embodiments flywheel system 200 further includes a top support 224 and a top magnetic levitation bearing 230. Top support 224 is an embodiment of top support 124 specifically tailored to interface (at least magnetically) with rotor 210 and its shaft 212. As discussed above in reference to FIG. 1, top magnetic levitation bearing 230 may be identical or similar to bottom magnetic levitation bearing 130. Top magnetic levitation bearing 230 includes a magnetic structure 232 mechanically coupled with top support 224, and a magnetic structure 234 mechanically coupled with a top end of rotor 210. Magnetic structure 232 may be identical or similar to magnetic structure 132, and magnetic structure 234 may be identical or similar to magnetic structure 134.

In the space between bottom support 222 and rotor 210 and in the space between top support 224 (if included) and rotor 210, flywheel system 200 forms an interface region 280. Interface region 280 accommodates bottom magnetic levitation bearing 130 and, when top support 224 is included, top magnetic levitation bearing 230. Interface region 280 may also accommodate other functional components that facilitate interaction between (a) rotor 210 and (b) bottom support 222 and top support 224 (if included). Such functional components may include (a) one or more generators that magnetically convert rotational energy of the rotor to an electrical energy output of the flywheel system and, conversely, magnetically convert an electrical energy input to the flywheel system to rotational energy of the rotor, and/or (b) one or more active magnetic bearings that actively stabilize the position of the rotor relative to the fixture. The active magnetic bearing(s) may be accompanied by one or more passive backup magnetic bearings that provides stabilization of the rotor in the event of failure of the active magnetic bearings. Herein, an "active magnetic bearing" refers to a bearing that is adjustable based upon an input signal. An active magnetic bearing may include one or more sensors in a feedback loop.

Fixture 220 may further include a radial wall 228 that cooperates with bottom support 222 and top support 224 to form an enclosure that contains rotor 210. This enclosure may be a vacuum enclosure.

Rotor 210 has transverse extent 262 and height 260. In one embodiment, transverse extent 262 is constant along rotation axis 190. In another embodiment, transverse extent 262 varies as a function of the position along the rotation axis, for example as discussed above in reference to FIG. 1. Transverse extent 262 may be a diameter. Each of transverse extent 262 and height 260 may be in the range between 10 and 200 centimeters.

FIG. 3 illustrates one flywheel system 300 having a stationary shaft and including a magnetic levitation bearing for rotor levitation with radial stabilization. FIG. 3 shows flywheel system 300 in cross-sectional view, with the cross section being in a plane that contains rotation axis 190. Flywheel system 300 is an embodiment of flywheel system 100. Flywheel system 300 includes a rotor 310 and a fixture 320, respective embodiments of rotor 110 and fixture 120. Fixture 320 includes a bottom support 322, a top support 324, and a stationary shaft 326 connecting bottom support 322 and top support 324. Stationary shaft 326 passes through an aperture of rotor 310, such that rotor 310 rotates about stationary shaft 326. Bottom support 322 and top support 324 are embodiments of bottom support 122 and top support 124, respectively, specifically configured for use with stationary shaft 326 and rotor 310. Fixture 320 may further include radial wall 228. Radial wall 228 may cooperate with bottom support 322 and top support 324 to form an enclosure for rotor 310. This enclosure may be a vacuum enclosure.

Flywheel system 300 further includes bottom magnetic levitation bearing 130. Magnetic structure 132 is mechanically coupled with bottom support 322, and magnetic structure 134 is mechanically coupled with a bottom end of rotor 310. Flywheel system 300 may also include top magnetic levitation bearing 230, with magnetic structures 132 and 134 being mechanically coupled with top support 324 and a top end of rotor 310, respectively.

Flywheel system 300 forms an interface region 380 that may accommodate functional components facilitating interaction between rotor 310 and fixture 320. As compared to interface region 280 of flywheel system 200, interface region 380 of flywheel system 300 further includes the space in aperture 312 between stationary shaft 326 rotor 310. By virtue of aperture 312 spanning the entire height 260 of rotor 310 and stationary shaft 326 passing through the entire height of aperture 312, flywheel system 300 offers a relatively large and spread-out interface region 380 between rotor 110 and fixture 120, as compared interface region 280 of flywheel system 200. This relatively large and spread-out interface region 380 enables relatively large distances between different magnetic components implemented in flywheel system 300, such that the different magnetic components may be positioned to minimize potential magnetic coupling between such different magnetic components. In particular, the large and spread-out interface region 380 allows for positioning bottom magnetic levitation bearing 130 and top magnetic levitation bearing 230 relatively far away from other magnetic field sources. Interface region 380 may thus provide optimal conditions for axial and radial stabilization by bottom magnetic levitation bearing 130 and, if included, top magnetic levitation bearing 230. This is a particularly significant advantage for embodiments of bottom magnetic levitation bearing 130 and top magnetic levitation bearing 230 that are purely passive since, in these embodiments, bottom magnetic levitation bearing 130 and top magnetic levitation bearing 230 cannot be actively adjusted to compensate for the presence of other magnetic fields. In embodiments of flywheel system 200 and 300 where other magnetic field sources are closer to bottom magnetic levitation bearing 130 (and, if included, top magnetic levitation bearing 230), magnetic shielding may be implemented to reduce the influence of such other magnetic field sources on the performance of bottom magnetic levitation bearing 130 (and, if included, top magnetic levitation bearing 230)

Stationary shaft 326 and aperture 312 have respective transverse extents 370 and 372. In one embodiment, each of transverse extents 370 and 372 is constant along rotation axis 190. In another embodiment, one or both of transverse extents 370 and 372 varies as a function of the position along the rotation axis. Each of transverse extents 370 and 372 may be a diameter. The difference between transverse extent 370 and 372 may be in the range between one and 20 millimeters. The ratio of transverse extent 372 to transverse extent 262 may be in the range between 5 and 50 percent. Transverse extent 370 may be in the range between 3 and 100 millimeters. Stationary shaft 326 may include steel or be made of steel, such as stainless steel.

Figure 5:
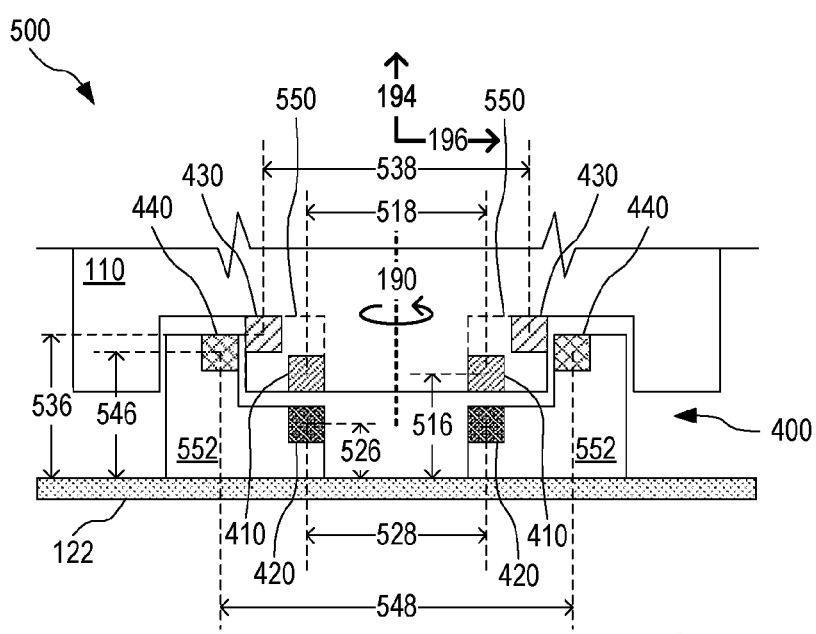
FIG. 5 illustrates a flywheel system that implements the four-ring magnetic bearing of FIG. 5, according to an embodiment.

FIG. 4 is a perspective view of one four-ring magnetic levitation bearing 400 that provides both axial and radial stabilization. Four-ring magnetic levitation bearing 400 is an example of either one of bottom magnetic levitation bearing 130 and top magnetic levitation bearing 230. Four-ring magnetic levitation bearing 400 may be implemented in either one of flywheel systems 200 and 300. FIG. 5 illustrates, in cross-sectional side view, a flywheel system 500 that implements four-ring magnetic levitation bearing 400. Flywheel system 500 is an embodiment of flywheel system 100 that implements one or both of bottom magnetic levitation bearing 130 and top magnetic levitation bearing 230 as four-ring magnetic levitation bearing 400. FIGS. 4 and 5 are best viewed together in the following description. FIG. 5 shows only a bottom portion of flywheel system 500, cropped partway through rotor 110. FIG. 4 shows four-ring magnetic levitation bearing 400 in perspective view from a viewing direction that, when magnetic levitation bearing is implemented in flywheel system 500, passes through rotor 110.

Four-ring magnetic levitation bearing 400 includes (a) a ring 410 of magnets 412, (b) a ring 420 of magnets 422, (c) a ring 430 of magnets 432, and (d) a ring 440 of magnets 442. Each of rings 410, 420, 430, and 440 encircles rotation axis 190. Rings 410 and 430 form an embodiment of magnetic structure 134, and rings 420 and 440 form an embodiment of magnetic structure 132. In one use implementation, rings 410 and 430 are mechanically coupled to a bottom end of rotor 110, and rings 420 and 440 are mechanically coupled to bottom support 122 (as shown in FIG. 5), such that four-ring magnetic levitation bearing 400 forms an embodiment of bottom magnetic levitation bearing 130. In another use implementation, rings 410 and 430 are mechanically coupled to a top end of rotor 110, and rings 420 and 440 are mechanically coupled to top support 124, such that four-ring magnetic levitation bearing 400 forms an embodiment of top magnetic levitation bearing 230. In an embodiment, each of magnets 412, 422, 432, and 442, is a permanent magnet, and four-ring magnetic levitation bearing 400 is configured to provide passive magnetic stabilization. Rings 410 and 430 may be substantially concentric, and rings 420 and 440 may be substantially concentric. When rotor 110 is radially centered relative to rotation axis 190, rings 410, 420, 430, and 440 may be concentric.

Magnets 422 repel magnets 412 such that the force exerted therebetween in substantially or predominantly axial, thus providing axial stabilization. Magnets 442 repel magnets 432 such that the force exerted therebetween includes a radial component, thus providing radial stabilization. The force exerted between magnets 442 and magnets 432 may further include an axial component and thus contribute to axial stabilization in addition to radial stabilization. The radial stabilization provided by magnetic coupling between magnets 442 and magnets 432 may overcome or at least reduce the radial instability introduced by the magnetic coupling between magnets 422 and magnets 412.

In the example shown in FIG. 4, each of magnets 412, 422, 432, and 442 is cube-shaped. Each cube may have a side-length in the range between 1 and 20 millimeters, for example between 2 and 4 millimeters. However, without departing from the scope hereof, the shape and/or size of one or more of magnets 412, 422, 432, and 442 may be different from that shown in FIG. 4, and the number of magnets in one or more of rings 410, 420, 430, and 440 may differ from the shown in FIG. 4. The gap between ring 410 and ring 420 may be in the range between a few millimeters and a fraction of a millimeter. Similarly, the radial distance between rings 430 and 440 may be in the range between a few millimeters and a fraction of a millimeter. The gap between rings 410 and 420 may be set to achieve a desired strength of the axial force therebetween. Similarly, the radial distance (and also the axial distance) between rings 430 and 440 may be set to achieve a desired strength of the radial (and also the axial) force therebetween. In one implementation, rings 410, 420, 430, and 440 are configured to produce stronger axial force than radial force.

As shown in FIG. 5, rings 410, 420, 430, and 440 have respective diameters 518, 528, 538, and 548, and are disposed at respective heights 516, 526, 536, and 546 relative to bottom support 122. It is understood that these heights may vary when rotor 110 moves relative to bottom support 122, and that these heights indicate nominal heights pertaining to a stable and desirable configuration of flywheel system 500. Height 516 exceeds height 526. Diameters 518 and 528 may be substantially identical, as shown in FIGS. 4 and 5, or differ slightly from each other. Diameter 548 exceeds diameter 538, and diameter 538 exceeds diameters 528 and 518. Height 536 exceeds height 516. In the example shown in FIGS. 4 and 5, height 536 exceeds height 546. However, without departing from the scope hereof, heights 536 and 546 may be the same, or height 536 may be less than height 546.

FIG. 4 indicates example polarities of magnets 412, 422, 432, and 442. Arrowheads 482 indicate north poles, and straight ends 480 indicate south poles. In the depicted example, (a) the polarity of each of magnets 412 and 422 is parallel to rotation axis 190 such that, in flywheel system 500, the north poles of magnets 412 face rotor 110 and the north poles of magnets 422 face away from rotor 110, and (b) the polarity of each of magnets 432 and 442 is perpendicular to rotation axis 190 such that the north poles of magnets 432 face away from rotation axis 190 and the north poles of magnets 442 face rotation axis 190. Without departing from the scope hereof, different polarity directions may be employed, as long as rings 410 and 420 repel each other and rings 430 and 440 repel each other. In one example, height 536 and 546 are different, and the polarities of magnets 432 and 442 point toward each other along a direction that is at an oblique angle to rotation axis 190.

Flywheel system 500 may include a mount 552 that mechanically couples rings 420 and 440 to bottom support 122. As shown in FIG. 5, rotor 110 may form a groove, encircling rotation axis 190, into which mount 552 protrudes so as to place rings 410, 420, 430, and 440 in the intended locations relative to each other. Alternatively, rotor 110 may include a mount (not shown in FIG. 5) that protrudes toward bottom support 122 so as to place rings 410, 420, 430, and 440 in the intended locations relative to each other. In an embodiment, rings 410 and 430 are affixed to a mount 550 in or on rotor 110.

Figure 6:
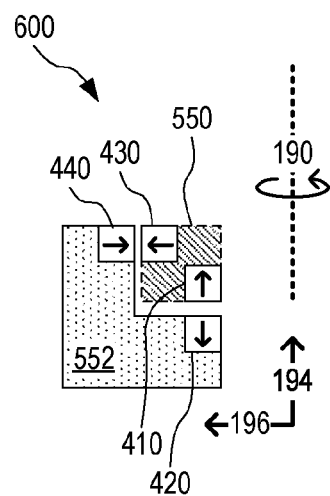
FIGS. 6, 7, and 8 illustrate three respective height configurations of the four-ring magnetic levitation bearing of FIG. 4 implemented in the flywheel system of FIG. 5, according to embodiments.
Figure 7:
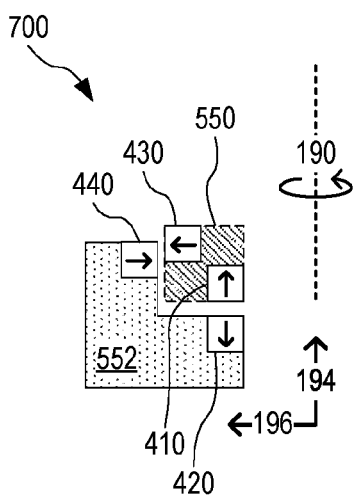
Figure 8:
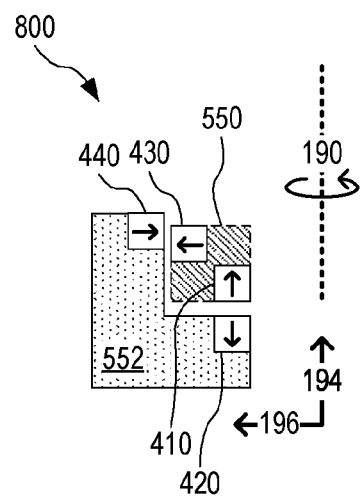

FIGS. 6, 7, and 8 illustrate three respective height configurations 600, 700, and 800 of four-ring magnetic levitation bearing 400 in flywheel system 500. The view in each of FIGS. 6, 7, and 8 corresponds to a view of a left-hand portion of FIG. 5. FIGS. 6, 7, and 8 are best viewed together in the following description. Height configurations 600, 700, and 800 differ from each other in the relationship between height 536 of ring 430 and height 546 of ring 440 (see height definitions in FIG. 5). In height configuration 600, heights 536 and 546 are identical. In height configuration 700, height 536 exceeds height 546. In height configuration 800, height 536 is less than height 546.

In height configuration 600, at the nominal heights, the magnetic coupling between rings 430 and 440 corresponds to a purely radial force therebetween. In height configurations 600 and 700, at the respective nominal heights, the force associated with magnetic coupling between rings 430 and 440 has both a radial and an axial component. In height configuration 700, at the nominal heights, the axial force component corresponds to an upwards force on rotor 110 in the direction away from bottom support 122. Thus, at the nominal heights in height configuration 700, the axial force component between rings 430 and 440 further contributes to the axial stabilization provided by the magnetic coupling between rings 410 and 420. In contrast, at the nominal heights in height configuration 800, the axial force component between rings 430 and 440 forces rotor 110 toward bottom support 122 and thus works against the axial force produced by the magnetic coupling between rings 410 and 420. In operation, flywheel system 500 may be subject to axial movement of its environment, e.g., foundation 180, and the relationship between heights 536 and 546 may change dynamically as a result of such axial movement.

Data presented below in Example I show that height configuration 800, at least under certain circumstances, is unstable. Example I demonstrates that the axially repelling force exerted by rings 420 and 440 on rings 410 and 430 diminishes when height 536 becomes less than height 546. Thus, height configurations 600 and 700 may provide greater stability than height configuration 800. Also, since any downwards movement of rotor 110 in height configuration 600 essentially corresponds to height configuration 800, and such movement is likely to occur during practical use of flywheel system 500, height configuration 700 may provide greater stability than height configuration 600. In one embodiment, flywheel system 500 is configured according to height configuration 700 with nominal heights 536 and 546 being tuned such that, even during movement of foundation 180, ring 430 remain higher than ring 440.

FIGS. 6, 7, and 8 indicate polarities of rings 410, 420, 430, and 440 with arrows inside rings 410, 420, 430, and 440. As discussed above in reference to FIGS. 4 and 5, the polarities may differ from that shown in FIGS. 6, 7, and 8.

Figure 9:
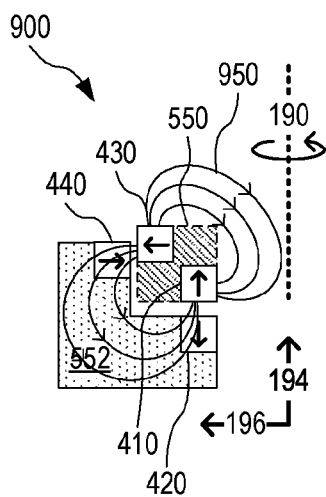
FIG. 9 shows one polarity configuration of the four-ring magnetic levitation bearing of FIG. 4 implemented in the flywheel system of FIG. 5, according to an embodiment.

FIG. 9 shows one polarity configuration 900 of four-ring magnetic levitation bearing 400 in flywheel system 500. Polarity configuration 900 may be implemented together with any one of height configurations 600, 700, and 800. In polarity configuration 900, the polarities of rings 410 and 430 is such that either (a) the north pole of ring 410 is closer to the south pole of ring 430 than to the north pole of ring 430, and the south pole of ring 430 is closer to the north pole of ring 410 than to the south pole of ring 410, or (b) the south pole of ring 410 is closer to the north pole of ring 430 than to the south pole of ring 430, and the north pole of ring 430 is closer to the south pole of ring 410 than to the north pole of ring 410. As a result, the respective magnetic fields from rings 410 and 430 are reasonably aligned with each other. If no significant magnetic shielding is applied between rings 410 and 430, the magnetic fields from rings 410 and 430 may cooperate to form a combined magnetic field 950. Mount 550 may be made of a non-magnetic material to promote this combination of magnetic fields to form combined magnetic field 950.

Figure 10:
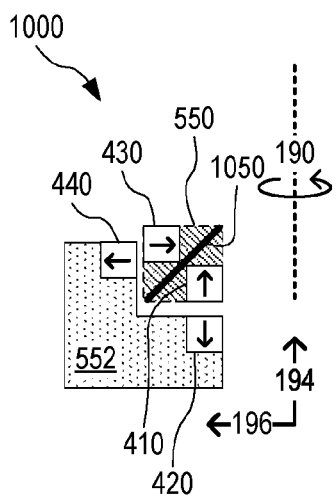
FIG. 10 shows another polarity configuration of the four-ring magnetic levitation bearing of FIG. 4 implemented in the flywheel system of FIG. 5, according to an embodiment.

FIG. 10 shows another polarity configuration 1000 of four-ring magnetic levitation bearing 400 in flywheel system 500. Polarity configuration 1000 may be implemented together with any one of height configurations 600, 700, and 800. In polarity configuration 1000, the polarity relationship between rings 410 and 430 is opposite that in polarity configuration 900. In polarity configuration 1000, the polarities of rings 410 and 430 is such that either (a) the north pole of ring 410 is closer to the north pole of ring 430 than to the south pole of ring 430, and the north pole of ring 430 is closer to the north pole of ring 410 than to the south pole of ring 410, or (b) the south pole of ring 410 is closer to the south pole of ring 430 than to the north pole of ring 430, and the south pole of ring 430 is closer to the south pole of ring 410 than to the north pole of ring 410. As a result, the respective magnetic fields from rings 410 and 430 are not aligned with each other. To avoid mutual cancellation of the magnetic fields from rings 410 and 430, polarity configuration 1000 may employ magnetic shielding 1050 between rings 410 and 430.

FIG. 11 illustrates, in a cross-sectional side view similar to that used in FIG. 5, another flywheel system 1100 that includes another four-ring magnetic levitation bearing 1102 providing both axial and radial stabilization. Four-ring magnetic levitation bearing 1102 is an example of either one of bottom magnetic levitation bearing 130 and top magnetic levitation bearing 230. Four-ring magnetic levitation bearing 1102 may be implemented in either one of flywheel systems 200 and 300. Flywheel system 1100 is an embodiment of flywheel system 100 that implements one or both of bottom magnetic levitation bearing 130 and top magnetic levitation bearing 230 as a respective four-ring magnetic levitation bearing 1102.

Four-ring magnetic levitation bearing 1102 includes (a) a ring 1110 of magnets, (b) a ring 1120 of magnets, (c) a ring 1130 of magnets, and (d) a ring 1140 of magnets. Each of rings 1110, 1120, 1130, and 1140 encircles rotation axis 190. Rings 1110 and 1130 form an embodiment of magnetic structure 134, and rings 1120 and 1140 form an embodiment of magnetic structure 132. In one use implementation, rings 1110 and 1130 are mechanically coupled to a bottom end of rotor 110, and rings 1120 and 1140 are mechanically coupled to bottom support 122. In another use implementation, rings 1110 and 1130 are mechanically coupled to a top end of rotor 110, and rings 1120 and 1140 are mechanically coupled to top support 124. Each of rings 1110, 1120, 1130, and 1140 may include a plurality of magnets, for example as discussed above in reference to FIG. 4. In an embodiment, each of these magnets is a permanent magnet, and four-ring magnetic levitation bearing 1102 is configured to provide passive magnetic stabilization.

Ring 1120 repels ring 1110 such that the force exerted therebetween in substantially or predominantly axial, thus providing axial stabilization. Ring 1140 repels rings 1130 such that the force exerted therebetween includes a radial component, thus providing radial stabilization. The force exerted between rings 1130 and 1140 may further include an axial component and thus contribute to axial stabilization in addition to radial stabilization. The radial stabilization provided by magnetic coupling between ring 1140 and ring 1130 may overcome or at least reduce the radial instability introduced by the magnetic coupling between ring 1120 and ring 1110.

The gap between ring 1110 and ring 1120 may be in the range between a few millimeters and a fraction of a millimeter. Similarly, the radial distance between rings 1130 and 1140 may be in the range between a few millimeters and a fraction of a millimeter. The gap between rings 1110 and 1120 may be set to achieve a desired strength of the axial force therebetween. Similarly, the radial distance (and also the axial distance) between rings 1130 and 1140 may be set to achieve a desired strength of the radial (and also the axial) force therebetween. In one implementation, rings 1110, 1120, 1130, and 1140 are configured to provide stronger axial force than radial force.

Rings 1110, 1120, 1130, and 1140 have respective diameters 1118, 1128, 1138, and 1148, and are disposed at respective heights 1116, 1126, 1136, and 1146 relative to bottom support 122. It is understood that these heights may vary when rotor 110 moves relative to bottom support 122, and that these heights indicate nominal heights pertaining to a stable and desirable configuration of flywheel system 1100. Height 1116 exceeds height 1126. Diameters 1118 and 1128 may be substantially identical, as shown in FIG. 11, or differ slightly from each other. Diameter 1148 exceeds diameter 1138, and diameter 1148 is smaller than diameters 1128 and 1118. Height 1116 exceeds height 1136. In the example shown in FIG. 11, height 1136 exceeds height 1146. However, without departing from the scope hereof, heights 1136 and 1146 may be the same, or height 1136 may be less than height 1146.

In one embodiment, (a) the polarity of each of rings 1110 and 1120 is parallel to rotation axis 190, and (b) the polarity of each of rings 1130 and 1140 is perpendicular to rotation axis 190. Without departing from the scope hereof, different polarity directions may be employed, as long as rings 1110 and 1120 repel each other and rings 1130 and 1140 repel each other. In one example, height 1136 and 1146 are different, and the polarities of magnets 1132 and 1142 point toward each other along a direction that is at an oblique angle to rotation axis 190.

Flywheel system 1100 may include a mount 1152 that mechanically couples rings 1120 and 1140 to bottom support 122. As shown in FIG. 11, rotor 110 may form a groove, encircling rotation axis 190, into which mount 1152 protrudes so as to place rings 1110, 1120, 1130, and 1140 in the intended locations relative to each other. Alternatively, rotor 110 may include a mount (not shown in FIG. 11) that protrudes toward bottom support 122 so as to place rings 1110, 1120, 1130, and 1140 in the intended locations relative to each other. In an embodiment, rings 1110 and 1130 are affixed to a mount 1150 in or on rotor 110.

FIGS. 12, 13, and 14 illustrate three respective height configurations 1200, 1300, and 1400 of four-ring magnetic levitation bearing 1102 in flywheel system 1100. The view in each of FIGS. 12, 13, and 14 corresponds to a view of a left-hand portion of FIG. 11. FIGS. 12, 13, and 14 are best viewed together in the following description. Height configurations 1200, 1300, and 1400 differ from each other in the relationship between height 1136 of ring 1130 and height 1146 of ring 1140 (see height definitions in FIG. 11). In height configuration 1200, heights 1136 and 1146 are identical. In height configuration 1300, height 1136 exceeds height 1146. In height configuration 1400, height 1136 is less than height 1146.

In height configuration 1200, at the nominal heights, the magnetic coupling between rings 1130 and 1140 corresponds to a purely radial force therebetween. In height configurations 1300 and 1400, at the respective nominal heights, the magnetic coupling between rings 1130 and 1140 produces both a radial and an axial force therebetween. In height configuration 1300, at the nominal heights, the axial force corresponds to an upwards force on rotor 110 in the direction away from bottom support 122. Thus, at the nominal heights in height configuration 1300, the axial force between rings 1130 and 1140 further contributes to the axial stabilization provided by the magnetic coupling between rings 1110 and 1120. In contrast, at the nominal heights in height configuration 1400, the axial force between rings 1130 and 1140 forces rotor 110 toward bottom support 122 and thus works against the axial force produced by the magnetic coupling between rings 1110 and 1120. In operation, flywheel system 1100 may be subject to axial movement of its environment, e.g., foundation 180, and the relationship between heights 1136 and 1146 may change dynamically as a result of such axial movement.

For reasons similar to those presented above in reference to FIGS. 6, 7, and 8, height configurations 1200, 1300, and 1400 have stability properties similar to those of height configurations 600, 700, and 800.

Whereas rings 410 and 430 are in close proximity to each other in four-ring magnetic levitation bearing 400, rings 1120 and 1140 are in close proximity to each other in four-ring magnetic levitation bearing 1102. Each of polarity configurations 900 and 1000, discussed above in reference to FIGS. 9 and 10, is transferrable to rings 1120 and 1130 of four-ring magnetic levitation bearing 1102.

Figure 15:
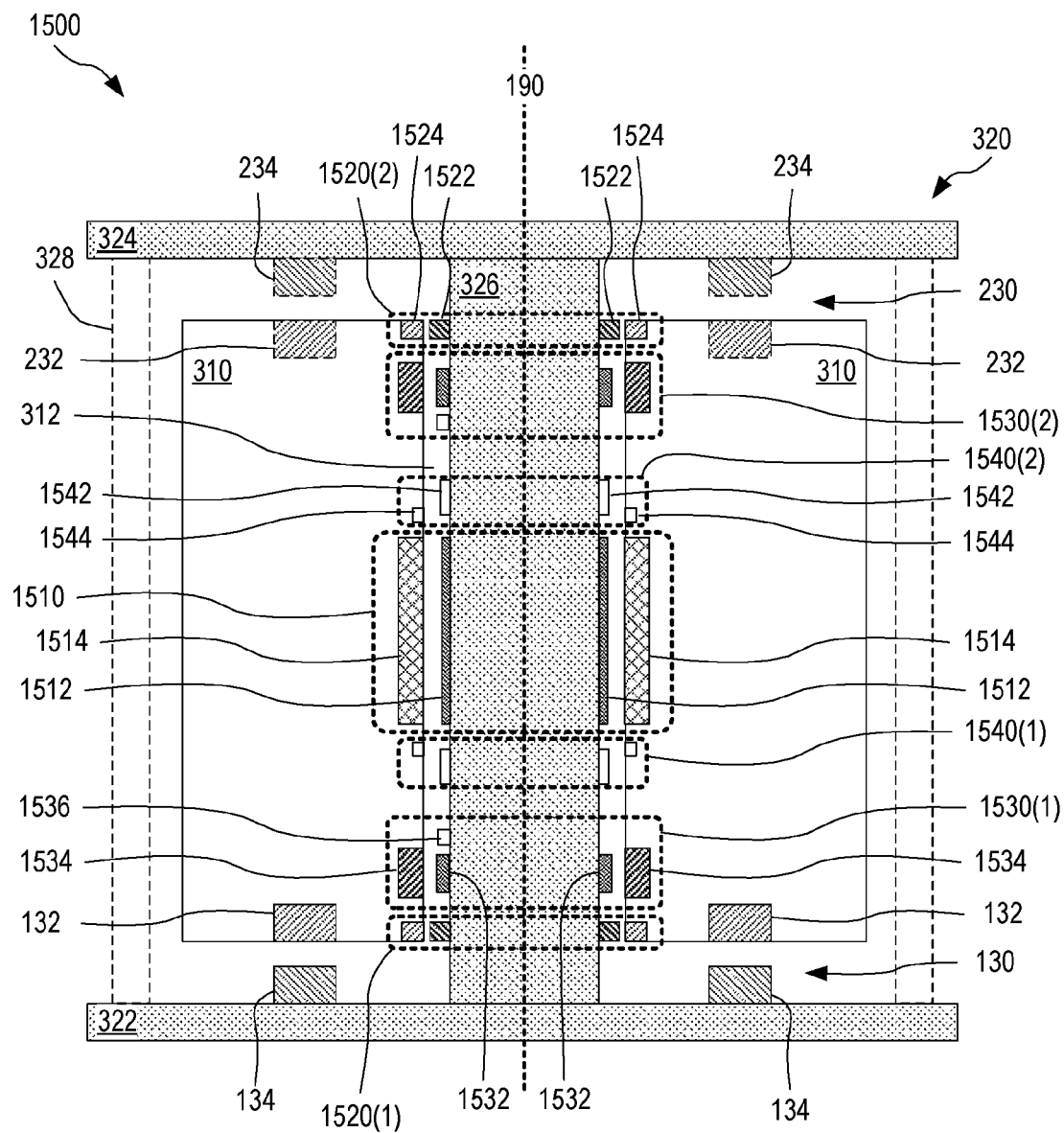
FIG. 15 illustrates a flywheel system having (a) a stationary shaft, (b) at least one magnetic levitation bearing for rotor levitation with radial stabilization, and (c) other magnetic modules implemented at the stationary shaft away from the at least one magnetic levitation bearing, according to an embodiment.

FIG. 15 illustrates one flywheel system 1500 having (a) a stationary shaft, (b) at least one magnetic levitation bearing for rotor levitation with radial stabilization, and (c) other magnetic modules implemented at the stationary shaft away from the at least one magnetic levitation bearing. Flywheel system 1500 is an embodiment of flywheel system 300 that includes at least one a generator 1510, at least one active magnetic bearing 1530, and at least one passive magnetic backup bearing 1520. Flywheel system 1500 may further include one or more active vertically stabilizing magnetic bearings 1540.

In flywheel system 1500, bottom magnetic levitation bearing 130 is implemented away from aperture 312 and stationary shaft 326. In certain embodiments, flywheel system 1500 also includes top magnetic levitation bearing 230, implemented away from aperture 312 and stationary shaft 326. Each of the at least one generator 1510, the at least one active magnetic bearing 1530, the least one passive magnetic backup bearing 1520, and, when included, the one or more active vertically stabilizing magnetic bearings 1540 is placed at stationary shaft 326, so as to minimize (a) presence of external magnetic fields at bottom magnetic levitation bearing 130 (and, when included, at top magnetic levitation bearing 230) and/or (b) the need for magnetic shielding to reduce such external magnetic fields.

FIG. 15 shows one generator 1510, two active magnetic bearings 1530, and two passive magnetic backup bearings 1520. However, without departing from the scope hereof, flywheel system 1500 may include a different number of any one of generator 1510, active magnetic bearing 1530, and passive magnetic backup bearing 1520. Similarly, in embodiments of flywheel system 1500 implementing one or more active vertically stabilizing magnetic bearings 1540, the number of active vertically stabilizing magnetic bearings 1540 may be different from that shown in FIG. 15, without departing from the scope hereof.

Each generator 1510 magnetically converts rotational energy of rotor 310 to an electrical energy output of flywheel system 1500, conversely, magnetically converts an electrical energy input to flywheel system 1500 to rotational energy of rotor 310. Generator 1510 may include (i) a plurality of permanent magnets 1514 mechanically coupled with rotor 310, and (ii) a generator stator 1512 mechanically coupled to stationary shaft 326. Generator stator 1512 magnetically couples with permanent magnets 1514 to convert between rotational energy of rotor 310 and electric current in windings of generator stator 1412.

Active magnetic bearing(s) 1530 actively stabilizes the position of rotor 310 relative to fixture 320. Each active magnetic bearing 1530 may include (i) a plurality of magnetizable elements 1534 mechanically coupled with rotor 310, and (ii) a plurality of electromagnets 1532 mechanically coupled to stationary shaft 326. Electromagnets 1532 magnetically couple with magnetizable elements 1534 to actively stabilize rotor 310 relative to fixture 320. Each active magnetic bearing 1530 may further include one or more sensors 1536 that senses position and/or motion of rotor 310 to provide an active feedback signal to electromagnets 1532.

Passive magnetic backup bearing(s) 1520 provides stabilization of rotor 310 in the event of failure of active magnetic bearing(s) 1530. Each passive magnetic backup bearing 1520 includes (i) a plurality of permanent magnets 1524 mechanically coupled with rotor 310, and (ii) a plurality of permanent magnets 1522 mechanically coupled to stationary shaft 326. Permanent magnets 1522 magnetically couple with permanent magnets 1524 to provide backup stabilization of rotor 310 relative to fixture 320 if one or more active magnetic bearings 1430 lose power or otherwise fail. In one embodiment, one passive magnetic backup bearing 1520 is positioned near bottom support 322. In this embodiment, the positioning of passive magnetic backup bearing 1520 at stationary shaft 326 and radially inwards from bottom magnetic levitation bearing 130 reduces magnetic interference between these two magnetic modules. In another embodiment, one passive magnetic backup bearing 1520 is positioned near top support 324 and flywheel system 1500 includes top magnetic levitation bearing 230. In this embodiment, the positioning of passive magnetic backup bearing 1520 at stationary shaft 326 and radially inwards from top magnetic levitation bearing 230 reduces magnetic interference between these two magnetic modules.

Active vertically stabilizing magnetic bearing(s) 1540 provides active stabilization of the axial position of rotor 310 relative to fixture 320. Each active vertically stabilizing magnetic bearing 1540 may include (i) a plurality of permanent magnets 1544 mechanically coupled with rotor 310, and (ii) a plurality of electromagnets 1542 mechanically coupled to stationary shaft 326. Electromagnets 1542 magnetically couple with permanent magnets 1544 to actively stabilize the axial position of rotor 310 relative to fixture 320. Each active vertically stabilizing magnetic bearing 1540 may further include one or more sensors (not shown in FIG. 15) that senses position and/or motion of rotor 310 to provide an active feedback signal to electromagnets 1542.

Figure 16:
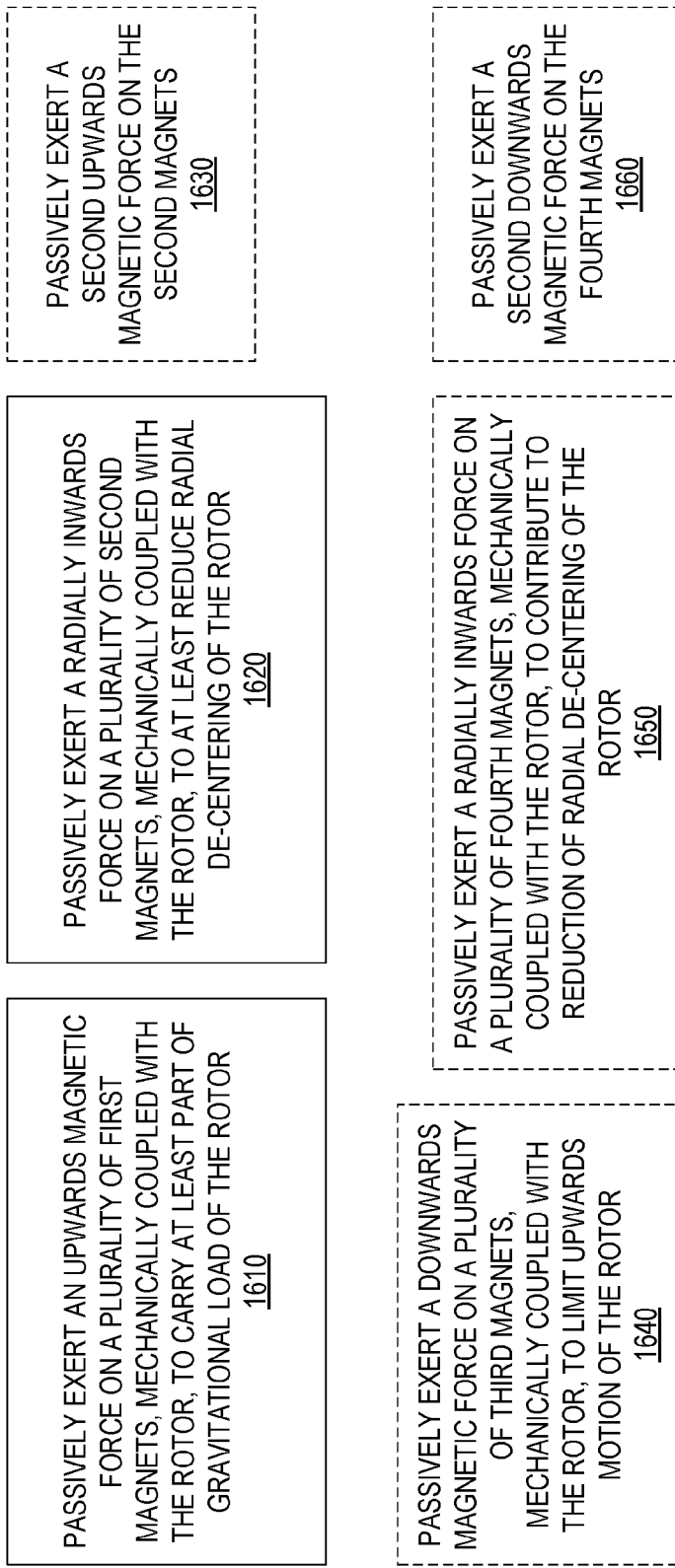
FIG. 16 illustrates a method for levitating and radially stabilizing a rotor of a flywheel system, according to an embodiment.

FIG. 16 illustrates one method 1600 for levitating and radially stabilizing a rotor of a flywheel system, such as flywheel system 500 or flywheel system 1100. Method 1600 includes steps 1610 and 1620. Step 1610 passively exerts an upwards magnetic force on a plurality of first magnets, mechanically coupled with the rotor, to carry at least part of the gravitational load of the rotor. Step 1610 may be performed by four-ring magnetic levitation bearing 400 implemented as bottom magnetic levitation bearing 130. In one such example of step 1610, ring 420 exerts an upwards magnetic force on ring 410, as discussed above in reference to FIGS. 4 and 5. Alternatively, step 1610 may be performed by four-ring magnetic levitation bearing 1102 implemented as bottom magnetic levitation bearing 130. In one such example of step 1610, ring 1120 exerts an upwards force on ring 1110, as discussed above in reference to FIG. 11. Step 1620 passively exerts a radially inwards force on a plurality of second magnets, mechanically coupled with the rotor, to at least reduce radial de-centering of the rotor. Step 1620 may be performed by four-ring magnetic levitation bearing 400 implemented as bottom magnetic levitation bearing 130. In one such example of step 1620, ring 440 exerts a radially inwards force on ring 430, as discussed above in reference to FIGS. 4 and 5. Alternatively, step 1620 may be performed by four-ring magnetic levitation bearing 1102 implemented as bottom magnetic levitation bearing 130. In one such example of step 1620, ring 1140 exerts a radially inwards force on ring 1130, as discussed above in reference to FIG. 11.

In an embodiment, method 1600 further includes a step 1630 of passively exerting a second upwards magnetic force on the second magnets. Step 1630 may be performed by four-ring magnetic levitation bearing 400 implemented as bottom magnetic levitation bearing 130. In one such example of step 1630, ring 440 exerts an upwards axial force on ring 430, for example as discussed above in reference to FIG. 7. Alternatively, step 1630 may be performed by four-ring magnetic levitation bearing 1102 implemented as bottom magnetic levitation bearing 130. In one such example of step 1630, ring 1140 exerts an upwards axial force on ring 1130, for example as discussed above in reference to FIG. 13.

Optionally, method 1600 includes generating the vertically upwards magnetic force and the radially inwards magnetic force (of steps 1610, 1620, and optionally step 1630) at least in part through magnetic coupling between (a) a permanent magnet assembly mechanically coupled to a support beneath the rotor and (b) the first and second magnets. For example, rings 410 and 430 may be magnetically coupled to each other as discussed above in reference to FIG. 9, or rings 1120 and 1140 may be magnetically coupled to each other as discussed above.

In certain embodiments, method 1600 further includes steps 1640 and 1650. Step 1640 passively exerts a downwards magnetic force on a plurality of third magnets, mechanically coupled with the rotor, to limit upwards motion of the rotor. Step 1640 may be performed by four-ring magnetic levitation bearing 400 implemented as top magnetic levitation bearing 230. In one such example of step 1640, ring 420 exerts a downwards magnetic force on ring 410, as discussed above in reference to FIGS. 4 and 5. Alternatively, step 1640 may be performed by four-ring magnetic levitation bearing 1102 implemented as top magnetic levitation bearing 230. In one such example of step 1610, ring 1120 exerts a downwards force on ring 1110, as discussed above in reference to FIG. 11. Step 1650 passively exerts a radially inwards force on a plurality of fourth magnets, mechanically coupled with the rotor, to contribute to reduction of radial de-centering of the rotor. Step 1650 may be performed by four-ring magnetic levitation bearing 400 implemented as top magnetic levitation bearing 230. In one such example of step 1650, ring 440 exerts a radially inwards force on ring 430, as discussed above in reference to FIGS. 4 and 5. Alternatively, step 1650 may be performed by four-ring magnetic levitation bearing 1102 implemented as top magnetic levitation bearing 230. In one such example of step 1650, ring 1140 exerts a radially inwards force on ring 1130, as discussed above in reference to FIG. 11.

Embodiments of method 1600, that include steps 1640 and 1650, may further include a step 1660 of passively exerting a second downwards magnetic force on the fourth magnets. Step 1660 may be performed by four-ring magnetic levitation bearing 400 implemented as top magnetic levitation bearing 230. In one such example of step 1660, ring 440 exerts a downwards axial force on ring 430, for example as discussed above in reference to FIG. 7. Alternatively, step 1660 may be performed by four-ring magnetic levitation bearing 1102 implemented as top magnetic levitation bearing 230. In one such example of step 1660, ring 1140 exerts a downwards axial force on ring 1130, for example as discussed above in reference to FIG. 13.

Example I: Stability of 300 Kilogram Rotor

Figure 17:
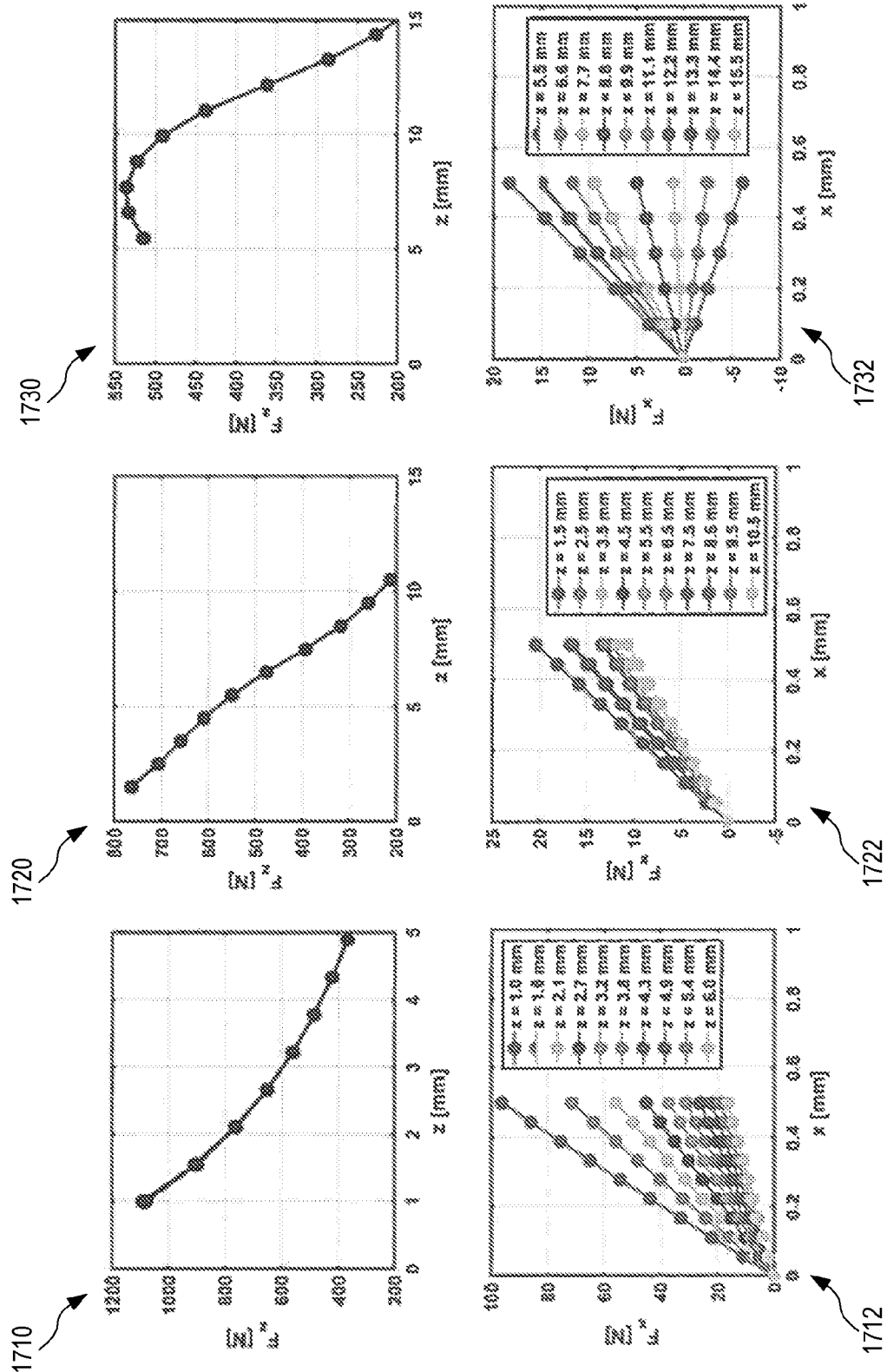
FIG. 17 shows example axial and radial forces calculated for different magnetic levitation bearings configured for use with a 300 kilogram rotor.

In this example, the axial and radial forces have been calculated for embodiments of four-ring magnetic levitation bearing 400 configured to levitate a 300 kilogram embodiment of rotor 110. The results are plotted in FIG. 17. Plots 1720 and 1722 pertain to an embodiment of four-ring magnetic levitation bearing 400 according to height configuration 700. Plots 1730 and 1732 pertain to an embodiment of four-ring magnetic levitation bearing 400 according to height configuration 800. Plots 1710 and 1712 pertain to an axial-only magnetic levitation bearing corresponding to four-ring magnetic levitation bearing 400 without rings 430 and 440.

Each of plots 1710, 1720, and 1730 shows the upwards axial force as a function of axial position of rotor 110. Each of plots 1712, 1722, and 1732 shows, for a plurality of axial positions of rotor 110, the radial force as a function of radial decentering distance. A positive value of the radial force corresponds to the radial force being outward, i.e., decentering.

Addressing first plots 1710 and 1712 as a baseline example, the axial-only magnetic levitation bearing produces a stable upwards axial force that increases in magnitude as rotor 110 drops, which is desirable (see plot 1710). However, the radially outward force is substantial. Even a small deviation from radial centering results in a strong radially outward force on rotor 110. This is an undesirable radial instability that must be counteracted by an active magnetic bearing.

Next, addressing the embodiment of four-ring magnetic levitation bearing 400 according to height configuration 700, plot 1720 shows a stable upwards axial force that increases in magnitude as rotor 110 drops, which is desirable. Plot 1722 shows a radially outward force that is greatly reduced as compared to that in plot 1712. This is a demonstration of improved stability provided by this example of four-ring magnetic levitation bearing 400. Since the radially outward forces in plot 1722 are significantly smaller than those in plot 1712, these forces are more easily counteracted, and the flywheel system will be more energy efficient as a consequence.

Finally, addressing the embodiment of four-ring magnetic levitation bearing 400 according to height configuration 800, plot 1730 shows an unstable upwards axial force that decreases in magnitude as rotor 110 drops below a certain height. This may be less desirable than the behavior shown in plot 1720. Plot 1732 shows radial forces of magnitude similar to those in plot 1722, with one difference being that the radial force in plot 1732 becomes radially inwards at the smallest heights.

Example II: Stability of 1500 Kilogram Rotor

In this example, the axial and radial forces have been calculated for an embodiment of four-ring magnetic levitation bearing 400 configured to levitate a 1500 kilogram embodiment of rotor 110. The embodiment considered here is configured according to height configuration 700. The results are plotted in FIG. 18. Plot 1810 shows, for a plurality of radial decentering distances of rotor 110, the upwards axial force as a function of axial position of rotor 110. Plot 1812 shows, for a plurality of axial positions of rotor 110, the radial force as a function of radial decentering distance. A positive value of the radial force corresponds to the radial force being outward, i.e., decentering. The behavior observed in plots 1810 and 1812 is similar to that observed in plots 1720 and 1722, except for being scaled to much higher force magnitudes as a result of the greater mass of rotor 110.

Combinations of Features

Features described above as well as those claimed below may be combined in various ways without departing from the scope hereof. For example, it will be appreciated that aspects of a flywheel system, or associated method, described herein may incorporate or swap features of another flywheel system, or associated method, described herein. The following examples illustrate possible, non-limiting combinations of embodiments described above. It should be clear that many other changes and modifications may be made to the methods and device herein without departing from the spirit and scope of this invention:

(A1) One flywheel system includes (a) a fixture including a bottom support, (b) a rotor characterized by a gravitational load and configured to rotate above the bottom support about a rotation axis, and (c) a bottom magnetic levitation bearing. The bottom magnetic levitation system includes (i) a ring of first magnets mechanically coupled with a bottom end of the rotor, (ii) a ring of second magnets mechanically coupled to the bottom support, beneath the ring of first magnets, wherein the second magnets repel the first magnets to magnetically support at least a portion of the gravitational load above the bottom support, (iii) a ring of third magnets mechanically coupled with the bottom end, and (iv) a ring of fourth magnets mechanically coupled to the bottom support radially outwards from the ring of third magnets, wherein the fourth magnets repel the third magnets to at least reduce radial decentering of the rotor relative to the fixture.

(A2) In the flywheel denoted as (A1), each of the first magnets, each of the second magnets, each of the third magnets, and each of the fourth magnets may be a permanent magnet.

(A3) In either of the flywheel systems denoted as (A1) and (A2), the magnetic field of each of the first and second magnets may be aligned parallel to the rotation axis.

(A4) In the flywheel system denoted as (A3), the magnetic field of each of the third and fourth magnets may be aligned orthogonal to the rotation axis.

(A5) In any of the flywheel systems denoted as (A1) through (A4), the first, second, third, and fourth magnets may be disposed at respective first, second, third, and fourth heights above the bottom support, wherein the first height exceeds the second height, the third height exceeding the fourth height.

(A6) In the flywheel system denoted as (A5), magnetic coupling between the third magnets and the fourth magnets may further contribute to supporting at least a portion of the gravitational load.

(A7) In either of the flywheel systems denoted as (A5) and (A6), the first, second, third, and fourth magnets are disposed at respective first, second, third, and fourth diameters relative to the rotation axis, wherein the third diameter exceeds the first and second diameters and the fourth diameter exceeds the third diameter.

(A8) In the flywheel system denoted as (A7), the first and second diameters may be identical.

(A9) In either of the flywheel systems denoted as (A7) and (A8), the third height may exceed the first height.

(A10) In the flywheel system denoted as (A9), the magnetic field of the first magnets may be aligned parallel to the rotation axis, the magnetic field of the third magnets may be aligned orthogonal to the rotation axis, each of the first magnets may have an upper pole and a lower pole and each of the third magnets may have an inner pole and an outer pole such that, for each nearest-neighbor pairs of one of the first magnets and one of the third magnets, the inner pole is closer to the upper pole than to the lower pole and the upper pole is closer to the inner pole than to the outer pole, wherein each of the inner pole and the lower pole is one of a north and a south pole and each of the outer pole and the upper pole is the other one of the north pole and the south pole.

(A11) In the flywheel system denoted as (A10), for each of the nearest-neighbor pairs, the magnetic field of the first magnet and the magnetic field of the third magnet may be intercoupled.

(A12) In any of the flywheel systems denoted as (A1) through (A6), the first, second, third, and fourth magnets may be disposed at respective first, second, third, and fourth diameters relative to the rotation axis, and the fourth diameter may be smaller than the first and second diameters, the third diameter being smaller than the fourth diameter.

(A13) In the flywheel system denoted as (A12), the first and second diameters may be identical.

(A14) In any of the flywheel systems denoted as (A11) through (A13), the second height may exceed the fourth height.

(A15) In the flywheel system denoted as (A14), the magnetic field of the second magnets may be aligned parallel to the rotation axis, the magnetic field of the fourth magnets may be aligned orthogonal to the rotation axis, each of the second magnets may have an upper pole and a lower pole and each of the fourth magnets may have an inner pole and an outer pole such that, for each nearest neighbor pairs of one of the second magnets and one of the fourth magnets, the inner pole is closer to the upper pole than to the lower pole and the upper pole is closer to the inner pole than to the outer pole, wherein each of the inner pole and the lower pole is one of a north and a south pole and each of the outer pole and the upper pole is the other one of the north pole and the south pole.

(A16) In the flywheel system denoted as (A15), for each of the nearest-neighbor pairs, the second magnet and the fourth magnet may be magnetically coupled with each other.

(A17) Any of the flywheel systems denoted as (A1) through (A16) may further include a top support implemented in the fixture, and a top magnetic levitation bearing that includes (i) a ring of fifth magnets mechanically coupled with a top end of the rotor, (ii) a ring of sixth magnets mechanically coupled to the top support, above the ring of fifth magnets, the sixth magnets repelling the fifth magnets to limit upwards motion of the rotor above the bottom support, (iii) a ring of seventh magnets mechanically coupled with the top end, and (iv) a ring of eighth magnets mechanically coupled to the top support radially outwards from the ring of seventh magnets, the eighth magnets repelling the seventh magnets, magnetic coupling between the seventh magnets and the eighth magnets cooperating with magnetic coupling between the third magnets and the fourth magnets to at least reduce radial decentering of the rotor.

(A18) In the flywheel system denoted as (A17), the fifth, sixth, seventh, and eighth magnets may be disposed at respective fifth, sixth, seventh, and eighth heights above the bottom support, wherein the sixth height exceeds the fifth height and the eighth height exceeds the seventh height.

(A19) In the flywheel system denoted as (A18), magnetic coupling between the seventh and eighth magnets may further contribute to limiting the upwards motion of the rotor.

(A20) Any of the flywheel systems denoted as (A1) through (A19) may further include (a) a generator including (i) a plurality of first permanent magnets mechanically coupled with the rotor, and (ii) a generator stator mechanically coupled to the fixture and configured to cooperate with the first permanent magnets to convert between rotational energy of the rotor and electric current in windings of the generator stator, (b) an active magnetic bearing including (i) a plurality of magnetizable elements mechanically coupled with the rotor, and (ii) a plurality of electromagnets mechanically coupled to the fixture and configured to magnetically couple with the plurality of magnetizable elements to actively stabilize the rotor relative to the fixture, and (c) a passive magnetic backup bearing including (i) a plurality of second permanent magnets mechanically coupled with the rotor, and (ii) a plurality of third permanent magnets mechanically coupled to the fixture and configured to magnetically couple with the second permanent magnets to provide backup stabilization of the rotor relative to the fixture if the active magnetic bearing fails.

(A21) In the flywheel system denoted as (A20), the passive magnetic backup bearing may be radially inwards from the bottom magnetic levitation bearing, and the bottom magnetic levitation bearing may be farther than the passive magnetic backup bearing from the generator.

(A22) In the flywheel system of claim 21, the rotor may form an aperture, the fixture may further include a shaft that passes through the aperture and connects the top support to the bottom support, the rotor may be configured to rotate about the shaft, each of the generator and the active magnetic bearing may be implemented in the shaft, the active magnetic bearing may be closer than the generator to the bottom support, and the passive magnetic backup bearing may be closer than the active magnetic bearing to the bottom support.

(B1) One method for levitating and radially stabilizing a rotor of a flywheel system includes (a) passively exerting an upwards magnetic force on a plurality of first magnets, mechanically coupled with the rotor, to carry at least part of gravitational load of the rotor, and (b) passively exerting a radially inwards force on a plurality of second magnets, mechanically coupled with the rotor, to at least reduce radial de-centering of the rotor.

(B2) The method denoted as (B1) may further include passively exerting a second upwards magnetic force on the second magnets.

(B3) Either of the methods denoted as (B1) and (B2) may include generating the vertically upwards magnetic force and the radially inwards magnetic force at least in part through magnetic coupling between (i) a permanent magnet assembly mechanically coupled to a support beneath the rotor and (ii) the first and second magnets.

(B4) Any of the methods denoted as (B1) through (B3) may further include passively exerting a downwards magnetic force on a plurality of third magnets, mechanically coupled with the rotor, to limit upwards motion of the rotor, and passively exerting a radially inwards force on a plurality of fourth magnets, mechanically coupled with the rotor, to contribute to reduction of radial de-centering of the rotor.

(B5) The method denoted as (B4) may further includes passively exerting a second downwards magnetic force on the fourth magnets.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:

1. A flywheel system, comprising:
a fixture including a bottom support;
a rotor having a gravitational load and configured to rotate above the bottom support about a rotation axis; and
a bottom magnetic levitation bearing including:
a ring of first permanent magnets mechanically coupled with a bottom end of the rotor, the ring of first permanent magnets having a first height and a first diameter, and the first permanent magnets having an upper first pole, a lower second pole and a magnetic field parallel to the rotation axis
a ring of second permanent magnets mechanically coupled to the bottom support, the ring of second permanent magnet having a second height lower than the first height and a second diameter approximately equal to the first diameter, and the second permanent magnets having upper second pole repelling the lower second pole of the first permanent magnets to magnetically support at least a portion of the gravitational load above the bottom support,
a ring of third permanent magnets mechanically coupled with the bottom end of the rotor, the ring of third permanent magnets having a third height greater and the third permanent magnets having an inner second pole, an outer first pole and a magnetic field orthogonal to the rotation axis, and
a ring of fourth permanent magnets mechanically coupled to the bottom support, the ring of fourth permanent magnets having a fourth height greater than the first height and less than the third height, and a fourth diameter greater than the third diameter, and the fourth permanent magnets having an inner first pole repelling the outer first pole of the third permanent magnets to at least reduce radial decentering of the rotor relative to the fixture,
wherein the upper first pole of the first permanent magnets is closer to the inner second pole of the third permanent magnets than to the outer first pole of the third permanent magnets, and the inner second pole of the third permanent magnets is closer to the upper first pole of first permanent magnets than to the lower second pole of first permanent magnets
a passive magnetic backup bearing including:
a plurality of first passive backup bearing permanent magnets mechanically coupled with the rotor, and
a plurality of second passive backup bearing permanent magnets mechanically coupled to the fixture and configured to magnetically couple with the first passive backup bearing permanent magnets to provide backup stabilization of the rotor relative to the fixture if the active magnetic bearing fails;
the passive magnetic backup bearing being radially inwards from the bottom magnetic levitation bearing, the bottom magnetic levitation bearing being farther than the passive magnetic backup bearing from a generator of the flywheel system.

2. The flywheel system of claim 1, magnetic coupling between the third permanent magnets and the fourth permanent magnets further contributing to supporting at least a portion of the gravitational load.

3. The flywheel system of claim 1, the first and second diameters being identical.

4. The flywheel system of claim 1, for each of the nearest-neighbor pairs, magnetic field of the first permanent magnet and magnetic field of the third permanent magnet being intercoupled.

5. The flywheel system of claim 1, further comprising:
a top support implemented in the fixture; and
a top magnetic levitation bearing including:
a ring of fifth permanent magnets mechanically coupled with a top end of the rotor,
a ring of sixth permanent magnets mechanically coupled to the top support, above the ring of fifth magnets, the sixth permanent magnets repelling the fifth permanent magnets to limit upwards motion of the rotor above the bottom support,
a ring of seventh permanent magnets mechanically coupled with the top end of the rotor, and
a ring of eighth permanent magnets mechanically coupled to the top support radially outwards from the ring of seventh permanent magnets, the eighth permanent magnets repelling the seventh permanent magnets, magnetic coupling between the seventh permanent magnets and the eighth permanent magnets cooperating with magnetic coupling between the third permanent magnets and the fourth permanent magnets to at least reduce radial decentering of the rotor.

6. The flywheel system of claim 5, the fifth, sixth, seventh, and eight permanent magnets being disposed at respective fifth, sixth, seventh, and eighth heights above the bottom support, the sixth height exceeding the fifth height, the eighth height exceeding the seventh height.

7. The flywheel system of claim 6, magnetic coupling between the seventh and eighth permanent magnets further contributing to limiting the upwards motion of the rotor.

8. A flywheel system, comprising:
a fixture including a bottom support;
a rotor having a gravitational load and configured to rotate above the bottom support about a rotation axis; and
a bottom magnetic levitation bearing including:
a ring of first permanent magnets mechanically coupled with a bottom end of the rotor, the ring of first permanent magnets having a first height and a first diameter, and the first permanent magnets having an upper first pole, a lower second pole and a magnetic field parallel to the rotation axis,
a ring of second permanent magnets mechanically coupled to the bottom support, the ring of second permanent magnets having a second height lower than the first height and a second diameter approximately equal to the first diameter, and the second permanent magnets having a upper second pole repelling the lower second pole of the first permanent magnets to magnetically support at least a portion of the gravitational load above the bottom support,
a ring of third permanent magnets mechanically coupled with the bottom end of the rotor, the ring of third permanent magnets having a third height greater than the first height and a third diameter greater than the first diameter, and the third permanent magnets having an inner second pole, an outer first pole and a magnetic field orthogonal to the rotation axis, and
a ring of fourth permanent magnets mechanically coupled to the bottom support, the ring of fourth permanent magnets having a fourth height greater than the first height and less than the third height, and a fourth diameter greater than the third diameter, and the fourth permanent magnets having an inner first pole repelling the outer first pole of the third permanent magnets to at least reduce radial decentering of the rotor relative to the fixture;
wherein the upper first pole of the first permanent magnets is closer to the inner second pole of the third permanent magnets than to the outer first pole of the third permanent magnets, and the inner second pole of the third permanent magnets is closer to the upper first pole of first permanent magnets than to the lower second pole of first permanent magnets;
the flywheel system further comprising:
a generator including:
a plurality of first generator permanent magnets mechanically coupled with the rotor, and
a generator stator mechanically coupled to the fixture and configured to cooperate with the first generator permanent magnets to convert between rotational energy of the rotor and electric current in windings of the generator stator;

an active magnetic bearing including:
a plurality of magnetizable elements mechanically coupled with the rotor, and
a plurality of electromagnets mechanically coupled to the fixture and configured to magnetically couple with the plurality of magnetizable elements to actively stabilize the rotor relative to the fixture; and
a passive magnetic backup bearing including:
a plurality of first passive backup bearing permanent magnets mechanically coupled with the rotor, and
a plurality of second passive backup bearing permanent magnets mechanically coupled to the fixture and configured to magnetically couple with the first passive backup bearing permanent magnets to provide backup stabilization of the rotor relative to the fixture if the active magnetic bearing fails.

9. A flywheel system, comprising:
a fixture including a bottom support;
a rotor having a gravitational load and configured to rotate above the bottom support about a rotation axis; and
a bottom magnetic levitation bearing including:
a ring of first permanent magnets mechanically coupled with a bottom end of the rotor, the ring of first permanent magnets having a first height and a first diameter, and the first permanent magnets having an upper first pole, a lower second pole and a magnetic field parallel to the rotation axis,
a ring of second permanent magnets mechanically coupled to the bottom support, the ring of second permanent magnets having a second height lower than the first height and a second diameter approximately equal to the first diameter, and the second permanent magnets having a upper second pole repelling the lower second pole of the first permanent magnets to magnetically support at least a portion of the gravitational load above the bottom support,
a ring of third permanent magnets mechanically coupled with the bottom end of the rotor, the ring of third permanent magnets having a third height greater than the first height and a third diameter greater than the first diameter, and the third permanent magnets having an inner second pole, an outer first pole and a magnetic field orthogonal to the rotation axis, and
a ring of fourth permanent magnets mechanically coupled to the bottom support, the ring of fourth permanent magnets having a fourth height greater than the first height and less than the third height, and a fourth diameter greater than the third diameter, and the fourth permanent magnets having an inner first pole repelling the outer first pole of the third permanent magnets to at least reduce radial decentering of the rotor relative to the fixture;
wherein the upper first pole of the first permanent magnets is closer to the inner second pole of the third permanent magnets than to the outer first pole of the third permanent magnets, and the inner second pole of the third permanent magnets is closer to the upper first pole of first permanent magnets than to the lower second pole of first permanent magnets;
the flywheel system of claim 1, further comprising:
a generator including:
a plurality of first generator permanent magnets mechanically coupled with the rotor, and
a generator stator mechanically coupled to the fixture and configured to cooperate with the first generator permanent magnets to convert between rotational energy of the rotor and electric current in windings of the generator stator;

an active magnetic bearing including:
- a plurality of magnetizable elements mechanically coupled with the rotor, and
- a plurality of electromagnets mechanically coupled to the fixture and configured to magnetically couple with the plurality of magnetizable elements to actively stabilize the rotor relative to the fixture; and a passive magnetic backup bearing including:
- a plurality of first passive backup bearing permanent magnets mechanically coupled with the rotor, and
- a plurality of second passive backup bearing permanent magnets mechanically coupled to the fixture and configured to magnetically couple with the first passive backup bearing permanent magnets to provide backup stabilization of the rotor relative to the fixture if the active magnetic bearing fails;

the passive magnetic backup bearing being radially inwards from the bottom magnetic levitation bearing, the bottom magnetic levitation bearing being farther than the passive magnetic backup bearing from the generator.

10. The flywheel system of claim 9, the rotor forming an aperture, the fixture further including a shaft that passes through the aperture and connects a top support to the bottom support, the rotor being configured to rotate about the shaft, each of the generator and the active magnetic bearing being implemented in the shaft, the active magnetic bearing being closer than the generator to the bottom support, the passive magnetic backup bearing being closer than the active magnetic bearing to the bottom support.

* * * * *